No. 689,812. Patented Dec. 24, 1901.
H. S. CREDLEBAUGH.
SPEED REGULATING CLUTCH.
(Application filed June 27, 1901.)
(No Model.)
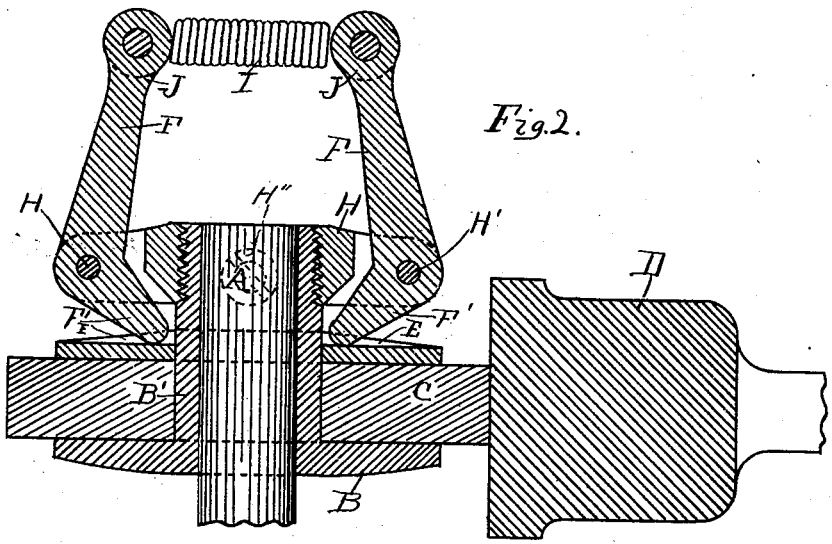
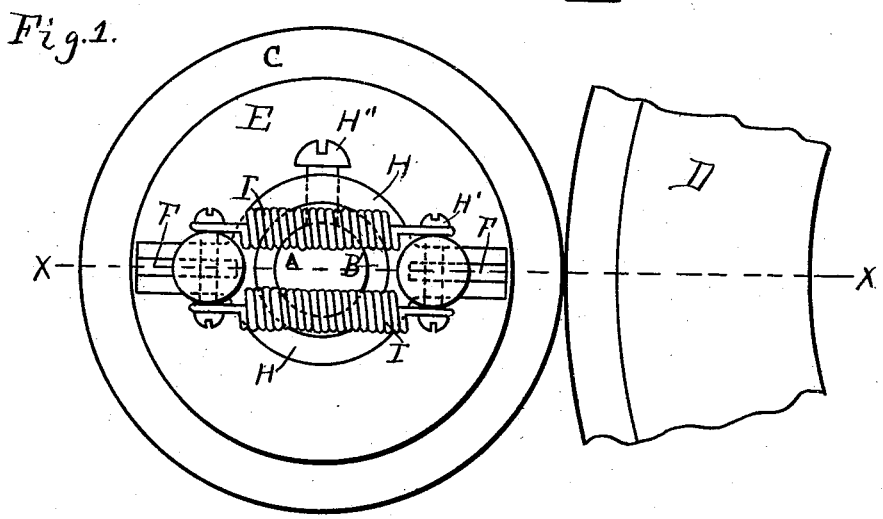 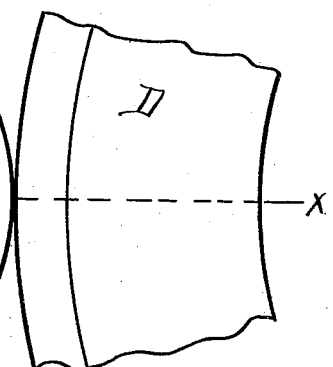
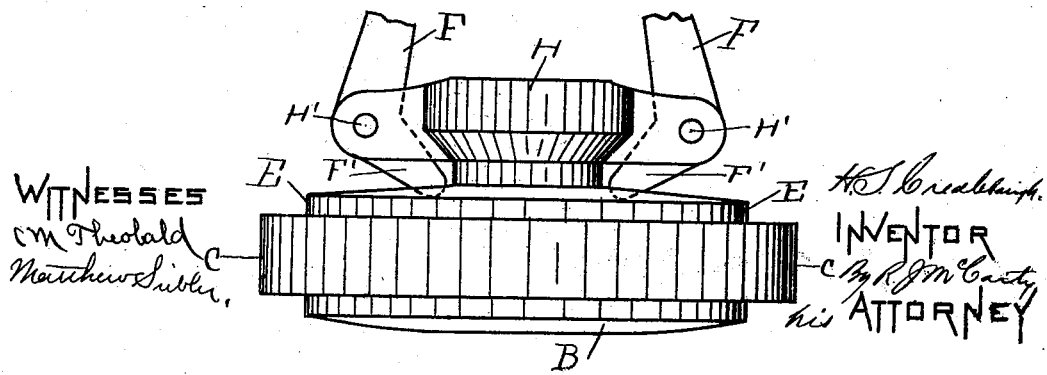

UNITED STATES PATENT OFFICE.

HENRY S. CREDLEBAUGH, OF NEW CARLISLE, OHIO, ASSIGNOR OF ONE-HALF TO W. F. BOHLANDER, OF PHONETON, OHIO.

SPEED-REGULATING CLUTCH.

SPECIFICATION forming part of Letters Patent No. 689,812, dated December 24, 1901.

Application filed June 27, 1901. Serial No. 66,268. (No model.)

*To all whom it may concern:*

Be it known that I, HENRY S. CREDLEBAUGH, a citizen of the United States, residing at New Carlisle, in the county of Clark and State of Ohio, have invented certain new and useful Improvements in Speed-Regulating Clutches; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention comprises a speed-regulating clutch for driving machines at uniform speeds from a machine or driver in which the speed is not uniform—for example, a dynamo.

The object of the invention is to provide a governor or automatic controlling device for preventing an overrunning of the dynamo and a consequent injury to the same due to burning out. This object is accomplished through the use of a governor or clutch device which is placed upon the shaft of the dynamo and is subject to the control of spring tension and centrifugal force. For example, when the driving-machine, which may be a gas or gasolene engine, is running at variable speed, as in the case of an automobile-engine, the speed transmitted to the dynamo will be very nearly, if not absolutely, uniform. This is due to the amount of frictional pressure between the clutch devices on the dynamo-shaft, as will be more fully described.

The invention is especially adapted to take the place of storage batteries and is intended for small dynamos, where a small amount of power is required to be transmitted. In this class of dynamos as they are turned out by the manufacturers there is a limited space on the shaft, which is utilized by the present invention, which comprises the clutch hereinafter fully described. In order to utilize this small space on the dynamo-shaft, which is not more than a half-inch, it is necessary to make the clutch of very compact form.

The invention has for its prime object to dispense with the use of primary or storage batteries for obtaining the initial spark in starting the engine.

In carrying out the objects and purposes of my invention I employ a comparatively small driven wheel on the dynamo-shaft, which is geared or belted to the fly or driving wheel of the engine. It will therefore be understood that a slow motion imparted to such fly-wheel, as in initially starting the same by hand, will transmit a comparatively fast movement to the much smaller wheel on the dynamo-shaft, and thus the initial spark will be furnished the engine practically instantaneous with the manual starting of the engine. The uniform speed of the dynamo is obtained by the driven wheel on the dynamo-shaft being subject to the control of springs and centrifugal force at different times, so that the ignition-sparks furnished the engine will be at uniform periods.

Preceding a detail description of my invention reference is made to the accompanying drawings, of which—

Figure 1 is an elevation of my improved speed-regulating clutch. Fig. 2 is a sectional view on the line $x\,x$ of Fig. 1. Fig. 3 is a detail elevation showing the clutch-collar in position on the shaft.

In a detail description of my invention similar reference-letters denote corresponding parts in the drawings.

A designates a portion of a dynamo-shaft, the dynamo not appearing. Upon this shaft a friction-disk B, having a sleeve B', is rigidly mounted. The sleeve B', it will be observed, extends approximately to an end of the shaft. The sleeve B' practically forms the hub of the friction-disk B, and by means thereof a rigid attachment of said disk to the shaft A is enabled. Owing to the limited amount of space on the dynamo-shaft, it is not practicable to provide the rigid disk B with a hub, for the reason that the said limited space will be encroached upon to such an extent as to make it impracticable to mount the other parts of the clutch. Therefore the said hub B' is made in the form of a sleeve upon which the other parts comprising the clutch are carried. Near midway of said sleeve a loose friction-disk E is mounted, and between these disks B and E a pulley C is placed, the said pulley being loose on the sleeve B', as is also the friction-disk E. For the purposes of my invention it is desirable that the pulley C be a separate part from the fixed friction-disk B in order that when said pulley runs idle it will be free from any friction or load, therefore will release the dynamo-shaft much easier and quicker than it would if it carried an extra amount of weight and was subjected to a greater friction in its rotation. In the case of small dynamos, for which my invention is especially adapted, it is necessary to release the pulley very freely, owing to the small amount of power required to drive the dynamo. Therefore by permitting the pulley to be entirely free from the friction-disk when running idle there is removed from said pulley any unnecessary and undesirable momentum, which would otherwise have a tendency to rotate the dynamo-shaft to some extent at least after the pulley was released.

D designates the rim of a fly-wheel, which, as before stated, may be the fly-wheel of a gas or gasolene engine.

As shown in the drawings, the wheels C and D are in frictional gear; but it will be readily understood that a belt connection may be had between the two wheels, or possibly they may be spur-gears. When driven by friction, the wheel C may be made of any of the preferred materials, such as vulcanized fiber, pressed paper, &c. As before stated, the pulley C is inclosed between two friction-disks, one of which is rigid on the shaft A, while the other is loose, and is therefore subject to lateral movement, under which the said wheel C may be locked to rotate with the shaft A, and vice versa. The movements of the loose disk E are effected through clutch-jaws F, which are pivoted at H' to a clutch-collar, the hub H of which is fast to the sleeve B' by means of a screw H'', which also fixes the sleeve B' to the shaft A, so that the said clutch-jaws, together with the sleeve B' and disk B, rotate at all times with the shaft A. The engaging ends F' of the clutch-jaws project to a suitable extent toward the axis of the loose disk E, and the said ends are at all times in more or less frictional contact with the adjacent face of the disk E. The outer ends of the jaws F are suitably weighted by governor-balls J, which are connected by closed coil-springs I. The normal effect of these springs is to bind the pulley C through the disk E to the rigid disk B, which condition is maintained as long as the strength of the springs I is greater than the effect of the centrifugal force of the shaft A upon the jaws F; but it will be readily understood that when the power of centrifugal force is greater than the strength of the springs the frictional contact between the loose disk E and the pulley C will diminish to an extent commensurate with the degree of centrifugal force exerted upon the clutch devices. The speed of the shaft A will consequently slow down when the pulley C is thrown out of gear therewith until the clutch-arms F again come under the influence of the springs I.

In many dynamos now in use which employ an electric battery to obtain an initial spark a change to other means—for example, to an engine for obtaining such initial spark—cannot be made without the substitution of a new dynamo or an entire new shaft, the latter of which is impracticable owing to the cost of the alteration in the dynamo. By means of the present invention such change may be made without substituting any parts of the dynamo.

Having described my invention, I claim—

1. In a clutch of the character specified, the combination of a shaft, a friction-disk rigidly mounted on said shaft having a sleeve B', another friction-disk loosely mounted on said sleeve B', a wheel through which said shaft is driven, said wheel being loosely mounted on said shaft between said friction-disks, a clutch-collar rigidly attached to the sleeve B', clutch-jaws pivotally connected to said collar and coil-springs connected to said clutch-jaws, the said clutch-jaws being enabled by said springs to effect a frictional contact between the friction-disks and the wheel, at such times when said jaws are not under the control of centrifugal force, substantially as and for the purposes specified.

2. In a speed-regulating clutch, the combination of a shaft, a friction-disk rigidly mounted upon said shaft, said friction-disk having a sleeve portion which incloses said shaft, a friction-disk loosely mounted upon said sleeve, a wheel loosely mounted upon said sleeve between the friction-disks, clutch-jaws, a collar to which said clutch-jaws are pivoted, said collar being rigidly united to the sleeve, the ends of the clutch-jaws adjacent to the loose friction-disk being projected toward the axis of said friction-disk, and closed coil-springs controlling said clutch-jaws to engage the loose friction-disk and thereby frictionally lock the wheel to the shaft at such times when centrifugal force does not overcome the effect of said springs, substantially as and for the purposes specified.

In testimony whereof I affix my signature in presence of two witnesses.

HENRY S. CREDLEBAUGH.

Witnesses:
JOHN W. KALBFUS,
R. J. MCCARTY.